United States Patent [19]
Clayton

[11] 3,987,573
[45] Oct. 26, 1976

[54] RETRIEVER FOR SNAGGED FISHING LURES

[76] Inventor: Abner W. Clayton, P.O. Box 13165, San Antonic, Tex. 78213

[22] Filed: May 19, 1975

[21] Appl. No.: 578,638

[52] U.S. Cl. ............................................... 43/17.2
[51] Int. Cl.² .......................................... A01K 97/00
[58] Field of Search .................................. 43/17.2

[56] References Cited
UNITED STATES PATENTS

| | | | |
|---|---|---|---|
| 2,482,037 | 9/1949 | Swaim | 43/17.2 |
| 2,714,777 | 8/1955 | Peak | 43/17.2 |
| 3,191,335 | 6/1965 | Sobetzer | 43/17.2 |
| 3,246,415 | 4/1966 | Forbes | 43/17.2 |
| 3,550,303 | 12/1970 | Western | 43/17.2 |
| 3,623,258 | 11/1971 | Doane | 43/17.2 |

*Primary Examiner*—Warner H. Camp
*Attorney, Agent, or Firm*—Willard J. Hodges, Jr.

[57] ABSTRACT

A fishing lure retriever for snagged fishing lures secured to a fishing line. The retriever consists of a cylindrical body supported around the line by line guides. A strong retrieving line is secured to the top end and hook snaring chains dangle from the bottom end. The device slides down a fishing line, engages and retrieves snagged fishing lures.

6 Claims, 5 Drawing Figures

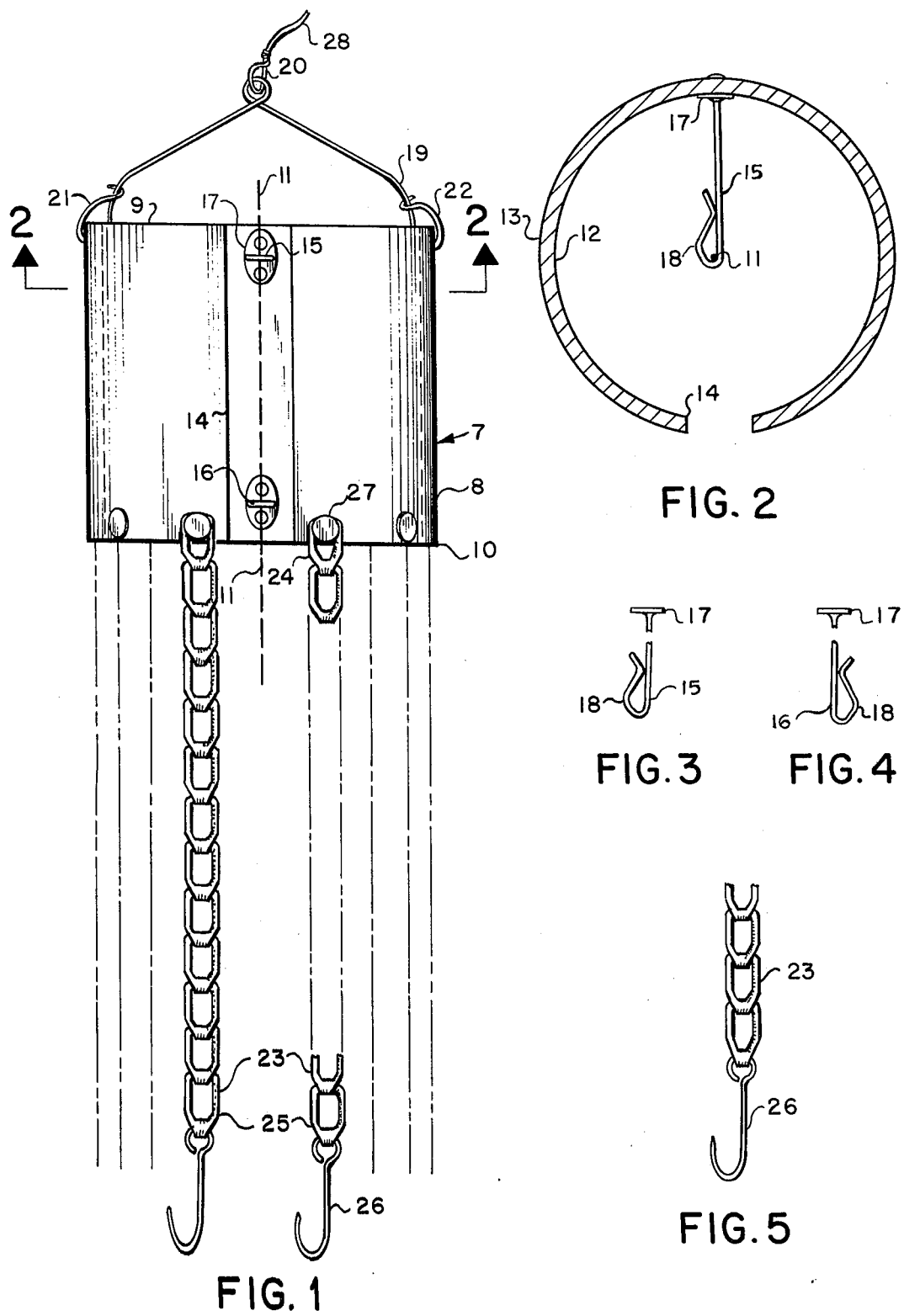

RETRIEVER FOR SNAGGED FISHING LURES

BACKGROUND OF THE INVENTION

1. Field of the Invention

This invention relates to a retriever for snagged fishing lures. The device is designed to be suspended around a fishing line secured to a snagged lure which is to be retrieved. The device slides down the line and becomes attached to the hooks of the lure which is to be retrieved.

2. Description of the Prior Art

Various techniques are employed by fishermen to release or retrieve a snagged fishing lure. A common improvised device is a hook swivel secured to the insulator of a spark plug. The device is attached to the fishing line and slides along the line. The jiggling of the line frequently releases the snagged lure. Various structures to be secured to the fishing line for retrieving snagged lures have been invented, some of which are patented. Among these patented are Koester, 2,739,404; Boggs, 2,788,606; Garrison, 2,798,332.

SUMMARY OF THE INVENTION

The device of this invention comprises a hollow, metallic cylinder. The cylinder includes a slit along one side projecting the full length of the cylinder. Projecting into the center of the cylinder is stainless steel line guides which may be slidably secured around the fishing line. At the top end of the device is secured a high tensile strength retrieving line which is attached to a wire bail. Dangling from the bottom end of the cylindrical body is attached a series of hook snaring chains. These chains may include nine hook hooks at the lower end for snaring the lure to be retrieved. When the device slides down the fishing line to the snagged lure the hook snaring chains may become attached to the hooks of the fishing lure or the hook hooks at the loose end of the chains may attach themselves to the lure to be retrieved. After the chain or hooks become attached a strong pull on the retrieving line will recover the snagged lure.

For a detailed description of the construction and operation of the preferred embodiment your attention is invited to the attached drawings wherein identical reference characters refer to identical or equivalent components throughout the various views and the detailed description.

BRIEF DESCRIPTION OF THE DRAWINGS

FIG. 1 is a perspective view of the device illustrating the various arrangement of the components as it would substantially appear positioned around a fishing line.

FIG. 2 is a sectional view of the device taken substantially on line 2—2 of FIG. 1 looking in the direction of the arrows.

FIG. 3 is a fragmented view illustrating the details of the configuration of the upper line guide.

FIG. 4 is a fragmented view illustrating the details of the configuration of the lower line guide.

FIG. 5 is a fragmented view illustrating the detail of a portion of the hook snaring chain with a hook hook secured to the loose end of the chain.

DESCRIPTION OF THE PREFERRED EMBODIMENT

For a detailed description of the construction of the preferred embodiment reference is made to the various figures. The body 7 of the preferred embodiment was constructed from an extra heavy gauge section of copper tubing 2½ inches inside diameter and 2½ inches in length. The sectional cut results in a cylinder 8 having a top end 9 and a bottom end 10. The cylinder 8 projects on an axis 11 and is hollow having an inner surface 12 and an outer surface 13. Projecting for the entire length of cylinder 8 is slit 14 which is one-half inch wide and projects from the top end 9 to the bottom end 10. Projecting from the inner surface 12 of cylinder 8 to a position substantially at the axis 11 of the device is upper line guide 15 and lower line guide 16. The configuration of these line guides are substantially as illustrated in FIGS. 3 and 4. The line guides 15 and 16 are preferably constructed of stainless steel wire 1/16 to one-eighth inch in diameter. The line guides 15 and 16 are attached to inner surface 12 of cylinder 8 by means of line guide securing means 17. These devices project from the wall of cylinder 8 in the direction of slit 14 and terminate approximately at the central axis 11 of the cylinder 8. At the opposite end from line guide securing means 17 is formed a line loop 18. These line loops 18 are formed in the configuration to loop over and attach themselves around the fishing line (not shown). The line loops 18 are preferably constructed with a right bend in the upper line guide 15 and a left bend in the lower line guide 16. Attached to the top end 9 of cylinder 8 is a stainless steel wire bail 19 having a conventional bail configuration. From the center of wire bail 19 is loop-like bail eye 20. This wire bail 19 is secured to a top end 9 of cylinder 8 at each side by a first bail attachment 21 and a second bail attachment 22. These bail attachments 21 and 22 may comprise holes projecting through a thickness of the wall of cylinder 8 through which the ends of wire bail 19 project. Various other methods of securing might be employed. Secured to the bottom end 10 of cylinder 8 in the preferred embodiment were nine evenly spaced interlocking hook snaring chains 23. The configuration of this series of hook snaring chains 23 were of conventional construction comprising brass chain having small interlocking links of a folding configuration. Each of these chains in the preferred embodiment were 9 inches in overall length. The configuration of these chains is perhaps best illustrated in the fragmented view, FIG. 5. Each of these chains 23 have a secured end 24 and a loose end 25. An unbarbed hook hook 26 having substantially the configuration of a fish hook may be attached to the loose end 25 of chain 23. The purpose or function of these hook hooks 26 is in the retrieving of fishing lures having weedless hooks (not shown). The secured end 24 of each of the hook snaring chains 23 are attached to the bottom end 10 of cylinder 8 with chain cylinder attachments 27. These attachments 27 might comprise a self-threading screw projecting through the wall of bottom end 10 of cylinder 8. Other methods of attaching might well be employed, such as riveting, pop riveting, or welding. To complete the configuration of the device to an operable structure a 25 foot section of strong nylon line constituting a retrieving line 28 is secured to bail eye 20. In the preferred embodiment ⅛ inch nylon line was employed. The foregoing completes the structures of the preferred embodiment. Modifications would appear obvious to those familiar with the art from an examination of the foregoing description and the appended claims.

OPERATION OF THE DEVICE

The fishing lure retriever of this invention is designed primarily for use by fishermen trolling or plugging banks in moss or occasional brush areas with the various designed fishing reels, rods and lures designed principally for fresh water lake or stream fishing. In the event a lure becomes snared the fisherman would normally move the boat to the vicinity of the snared lure and tension his line to the lure. The body of the device 7 is positioned in the manner as to project the slit 14 over the fishing line (not shown) at which time the line guide 15 and lower line guide 16 are secured around the line attached to the lure. Securely grasping the retrieving line 28 the retriever is permitted to sink down the line to the vicinity of the snagged lure. A jiggling of the fishing line and the retrieving line 28 usually results in a prompt attachment of one or more of the hook snaring chains 23 to hooks on the fishing lure or the engaging of the fishing lure by one or more of the hook hooks 26. A firm pull on retrieving line 28 retrieves the snagged fishing lure secured to the line. Having described in detail the construction and operation of the preferred embodiment, what is desired to be claimed is all modification or equivalents not departing from the scope of the appended claims.

I claim:
1. A device for retrieving a snagged fishing lure attached to a fishing line comprising:
   a. an elongated cylindrical body having an inner surface and an outer surface and a top end and a bottom end, said elongated cylindrical body adapted to encompass a fishing line,
   b. said elongated cylindrical body comprising a cylinder projecting on a central axis,
   c. line guide means for slidably securing the device around a fishing line positioned in the vicinity of said elongated central axis, said line guide means further comprising:
      1. an upper line guide projecting inward from the interior surface of said cylindrical body terminating in a line loop bend arching in a first direction at substantially the central axis of said cylindrical body,
      2. a lower line guide projecting inward from the interior surface of said cylindrical body terminating in a line loop bend arching in a second direction at substantially the central axis of said cylindrical body,
   d. a line slot constructed in the said elongated cylindrical body, said line slot extending from the top end to the bottom of said elongated cylindrical body, said line slot being positioned in said cylinder on a line in projection of said upper line guide and said lower line guide, said line slot being positioned parallel to said upper line guide and said lower line guide,
   e. a hook snaring chain appended to the said elongated cylindrical body,
   f. said hook snaring chain having:
      1. a secured end attached to said cylindrical body, the opposite end of said hook snaring chain constituting,
      2. a loose end.
2. The invention of claim 1 further comprising a multiplicity of hook snaring chains secured to the bottom end of said cylindrical body.
3. The invention of claim 2 further comprising hook hooks secured to the said loose end of said hook snaring chains.
4. The invention of claim 1 further comprising:
   a. a retrieving line secured to said cylindrical body,
   b. means for securing said line to said cylindrical body.
5. The invention of claim 4 wherein said means for securing said retrieving line to said cylindrical body is a wire bail.
6. The invention of claim 4 wherein said means for securing said retrieving line to said cylindrical body comprises:
   a. a wire bail having,
   b. a bail eye constructed at substantially the center of said wire bail,
   c. a first bail attachment constructed at one end of said wire bail and,
   d. a second bail attachment constructed at the second end of said wire bail.

* * * * *